US012614968B2

(12) United States Patent
Luo et al.

(10) Patent No.: US 12,614,968 B2
(45) Date of Patent: Apr. 28, 2026

(54) POWER STAGE AND POWER MODULE DESIGN TO MINIMIZE PARASITIC INDUCTANCE FOR MULTILEVEL INVERTER AND CONVERTER

(71) Applicant: GM Global Technology Operations LLC, Detroit, MI (US)

(72) Inventors: Yilun Luo, Ann Arbor, MI (US);
Muhammad Hussain Alvi, Troy, MI (US); Junghoon Kim, Ann Arbor, MI (US); Chandra S. Namuduri, Troy, MI (US); Rashmi Prasad, Troy, MI (US); Khorshed Mohammed Alam, Canton, MI (US); Sanjeev M. Naik, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 316 days.

(21) Appl. No.: 18/451,978

(22) Filed: Aug. 18, 2023

(65) Prior Publication Data

US 2025/0062676 A1     Feb. 20, 2025

(51) Int. Cl.
H02M 7/00         (2006.01)
H02M 1/00         (2006.01)
(Continued)

(52) U.S. Cl.
CPC ......... H02M 1/0048 (2021.05); H02M 7/003 (2013.01); H02M 7/537 (2013.01); H02P 27/06 (2013.01)

(58) Field of Classification Search
CPC .......... H02M 5/40; H02M 5/42; H02M 5/453;

H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266;
(Continued)

(56) References Cited

U.S. PATENT DOCUMENTS 5,172,310 A  *  12/1992  Deam ..................... H01L 23/52
                                              257/E23.141
6,021,060 A     2/2000  Tanaka et al.
(Continued)

OTHER PUBLICATIONS

German Application No. 10 2023 128 172.0 filed Oct. 14, 2023; German Office Action dated May 8, 2024; 5 pages.

*Primary Examiner* — Jeffrey A Gblende
*Assistant Examiner* — Nusrat Quddus
(74) *Attorney, Agent, or Firm* — CANTOR COLBURN LLP

(57) ABSTRACT

A vehicle includes an inverter having a power module. The power module includes a high side bus, a low side bus and an alternating current (AC) output bus. The high side bus includes a first switch, wherein a high side current is configured to flow through the first switch in a first direction. The high side bus is disposed in a plane. The low side bus includes a second switch, wherein a low side current is configured to flow through the second switch in the first direction. The low side bus is parallel to the high side bus. The alternating current (AC) output bus is parallel to the high side bus and the low side bus, wherein an output current flows through the AC output bus in a second direction opposite to the first direction.

20 Claims, 15 Drawing Sheets

(51) Int. Cl.
　　*H02M 7/537*　　　(2006.01)
　　*H02P 27/06*　　　(2006.01)

(58) Field of Classification Search
　　CPC .. H02M 2001/123; H02M 3/073; H02M 3/10;
　　　　　H02M 3/135; H02M 3/137; H02M 3/28;
　　　　　　H02M 3/315; H02M 3/3155; H02M
　　　　　3/325; H02M 3/335; H02M 7/10; H02M
　　　　　7/515; H02M 7/521; H02M 7/53; H02M
　　　　　7/537; H02M 7/5383; H02M 7/538466;
　　　　　H02M 7/53862; H02M 7/5387; H02M
　　　　　7/53871; H02M 7/53875; H02M 7/757;
　　　　　H02M 7/79; H02M 3/337; H02M 3/338;
　　　　　　H02M 3/3382; H02M 3/3384; H02M
　　　　　7/538; H02M 7/53806; H02M 7/53832;
　　　　　　H02M 7/53835; H02M 7/487; H02M
　　　　　7/539; H02M 7/23; H02M 7/217; H02M
　　　　　7/21; H02M 7/12; H02M 7/04; H02M
　　　　　7/00; H02H 7/261; H02H 7/268; H02J
　　　　　　　　　　　　　　　　3/36; H02J 3/01
　　See application file for complete search history.

(56)　　　　　　　　References Cited

U.S. PATENT DOCUMENTS

| | | | |
|---|---|---|---|
| 2016/0141973 A1* | 5/2016 | Abdalla .............. | H02M 5/4585 |
| | | | 363/36 |
| 2022/0093552 A1* | 3/2022 | Takeda ................ | H01L 23/3107 |
| 2025/0214473 A1* | 7/2025 | Nabizada ................ | B60L 53/53 |

* cited by examiner

500

502

506

504

HS

AC

LS

510

502

504

506

HS

LS

AC

POWER STAGE AND POWER MODULE DESIGN TO MINIMIZE PARASITIC INDUCTANCE FOR MULTILEVEL INVERTER AND CONVERTER

INTRODUCTION

The subject disclosure relates to electric inverters for converting direct current to alternating current, and, in particular, to an inverter design that reduces the occurrence of parasitic inductance in the inverter.

An inverter circuit has an inherent power loop in which high current flows from a high voltage side to a low voltage side and back. This power loop generates magnetic fields, which produce a parasitic inductance for any current path that crosses through it. Accordingly, it is desirable to design an inverter to reduce the occurrence of parasitic inductance.

SUMMARY

In one exemplary embodiment, a power module for an inverter is disclosed. The power module includes a high side bus, a low side bus and an alternating current (AC) output bus. The high side bus includes a first switch, wherein a high side current is configured to flow through the first switch in a first direction. The low side bus includes a second switch, wherein a low side current is configured to flow through the second switch in the first direction. The low side bus is parallel to the high side bus. The alternating current (AC) output bus is parallel to the high side bus and the low side bus, wherein an output current flows through the AC output bus in a second direction opposite to the first direction.

In addition to one or more of the features described herein, the high side bus and the low side bus are coplanar to each other within a first plane and the AC output bus is in a second plane.

In addition to one or more of the features described herein, the power module further includes a first heat sink coupled to the first plane and a second heat sink coupled to the second plane.

In addition to one or more of the features described herein, the high side bus is in a first plane, the low side bus in in a second plane parallel to the first plane, and the AC output bus is in a third plane, and one of the third plane is between the first plane and the second plane, the second plane is between the first plane and the third plane, and the first plane is between the second plane and the third plane.

In addition to one or more of the features described herein, a first magnetic field is generated by the high side current, a second magnetic field is generated by the low side current, and a third magnetic field is generated by the AC output current, wherein the first magnetic field, the second magnetic field and the third magnetic field cancel each other to minimize or reduce an occurrence of a parasitic inductance in a commutation loop.

In addition to one or more of the features described herein, the first switch and the second switch are coplanar to each other in a first plane and a third switch and a fourth switch are coplanar to each other in a second plane parallel to the first plane, wherein the AC output bus is between the first plane and the second plane.

In addition to one or more of the features described herein, the power module further includes a first plane, a second plane and a third plane, each parallel to each other, wherein the AC output bus includes a first AC output bus disposed between the first plane and the second plane and a second AC output bus disposed between the second plane and the third plane.

In addition to one or more of the features described herein, the first AC output bus connects to switches in the first plane and in the second plane at an end of the power module and the second AC output bus connects to switches in the second plane and in the third plane at the end of the power module.

In addition to one or more of the features described herein, the second AC output bus connects to switches in the second plane and in the third plane at a first end of the power module and the first AC output bus connects to switches in the first plane and in the second plane at a second end of the power module.

In addition to one or more of the features described herein, the inverter is one of a T-type inverter, an H-type inverter, and an X-type inverter.

In another exemplary embodiment, a vehicle is disclosed. The vehicle includes an inverter having a power module. The power module includes a high side bus including a first switch, wherein a high side current is configured to flow through the first switch in a first direction, a low side bus including a second switch, the low side bus parallel to the high side bus, wherein a low side current is configured to flow through the second switch in the first direction, and an AC output bus parallel to the high side bus and the low side bus, wherein an output current flows through the AC output bus in a second direction opposite to the first direction.

In addition to one or more of the features described herein, the high side bus and the low side bus are coplanar to each other within a first plane and the AC output bus is in a second plane.

In addition to one or more of the features described herein, the vehicle further includes a first heat sink coupled to the first plane and a second heat sink coupled to the second plane.

In addition to one or more of the features described herein, the high side bus is in a first plane, the low side bus in in a second plane parallel to the first plane, and the AC output bus is in a third plane, and one of the third plane is between the first plane and the second plane, the second plane is between the first plane and the third plane, and the first plane is between the second plane and the third plane.

In addition to one or more of the features described herein, a first magnetic field of the high side current, a second magnetic field of the low side current, and a third magnetic field generated by the AC output current cancel each other to minimize or reduce an occurrence of a parasitic inductance in a commutation loop.

In addition to one or more of the features described herein, the first switch and the second switch are coplanar to each other in the first plane of switches and a third switch and a fourth switch are coplanar to each other in a second plane of switches parallel to the first plane of switches, wherein the AC output bus is between the first plane of switches and the second plane of switches.

In addition to one or more of the features described herein, the vehicle further includes a first plane of switches, a second plane of switches and a third plane of switches, each parallel to each other, wherein the AC output bus includes a first AC output bus disposed between the first plane of switches and the second plane of switches and a second AC output bus disposed between the second plane of switches and the third plane of switches.

In addition to one or more of the features described herein, the first AC output bus connects to switches in the first plane of switches and the second plane of switches at an end of the power module and the second AC output bus connects to switches in the second plane of switches and the third plane of switches at the end of the power module.

In addition to one or more of the features described herein, the second AC output bus connects to switches in the second plane of switches and the third plane of switches at a first end of the power module and the first AC output bus connects to switches in the first plane of switches and the second plane of switches at a second end of the power module.

In addition to one or more of the features described herein, wherein the inverter is one of a T-type inverter, an H-type inverter, and an X-type inverter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
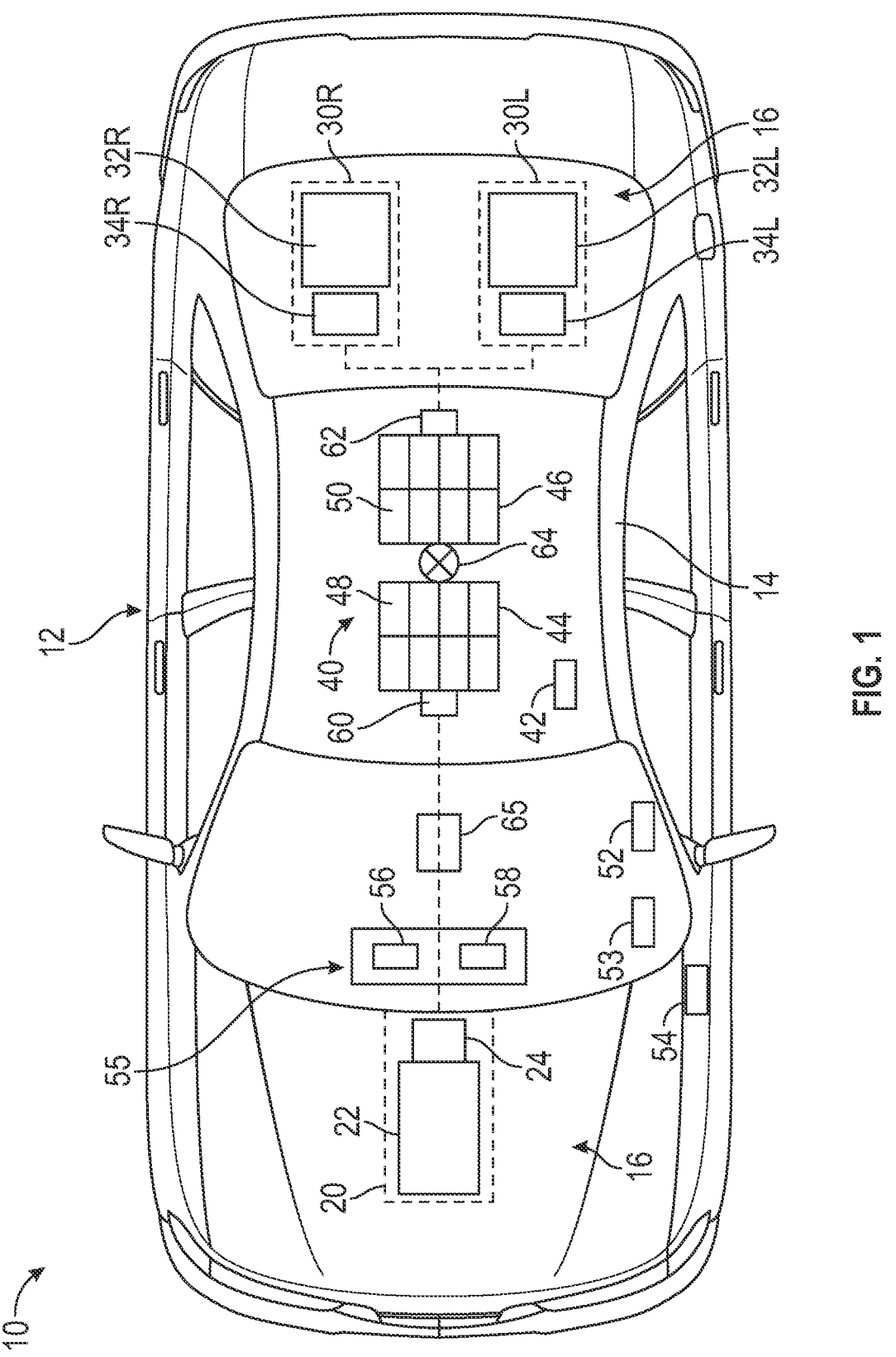
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes an electric motor 32L and an inverter 34L. A right rear drive unit 30R includes an electric motor 32R and an inverter 34R. The inverters 24, 34L and 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 and rear electric motors 32L and 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives front wheels (not shown) and the rear electric motors 32L and 32R drive rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery sub-pack 44 connected to the front inverter 24, and a second battery sub-pack 46. The first battery sub-pack 44 includes a plurality of battery modules 48, and the second battery sub-pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery.

Each of the front electric motor 22 and the rear electric motors 32L and 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the battery packs 44 and 46, and selectively connecting the battery packs 44 and 46 to the front drive unit 20, left rear drive unit 30L and right rear drive unit 30R. The switching devices may also be operated to selectively connect the first battery sub-pack 44 and the second battery sub-pack 46 to a charging system. The charging system can be used to charge the first battery sub-pack 44 and the second battery sub-pack 46, and/or to supply power from the first battery sub-pack 44 and/or the second battery sub-pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects the first battery sub-pack 44 to the inverters 24, 34L and 34R, and a second switching device 62 that selectively connects the second battery sub-pack 46 to the inverters 24, 34L and 34R. The switching system also includes a third switching device 64 (also referred to as a "battery switching device") for selectively connecting the first battery sub-pack 44 to the second battery sub-pack 46 in series.

Any of various controllers can be used to control functions of the battery system 40, the switching system and the drive units. A controller includes any suitable processing device or unit and may use an existing controller such as a drive system controller, an RESS controller, and/or controllers in the drive system. For example, a controller 65 may be included for controlling switching and drive control operations as discussed herein.

The controller 65 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 65 may include a non-transitory computer-readable medium that stores instructions which, when processed by one or more processors of the controller 65, implement a method of heating a battery pack, according to one or more embodiments detailed herein.

Figure 2:
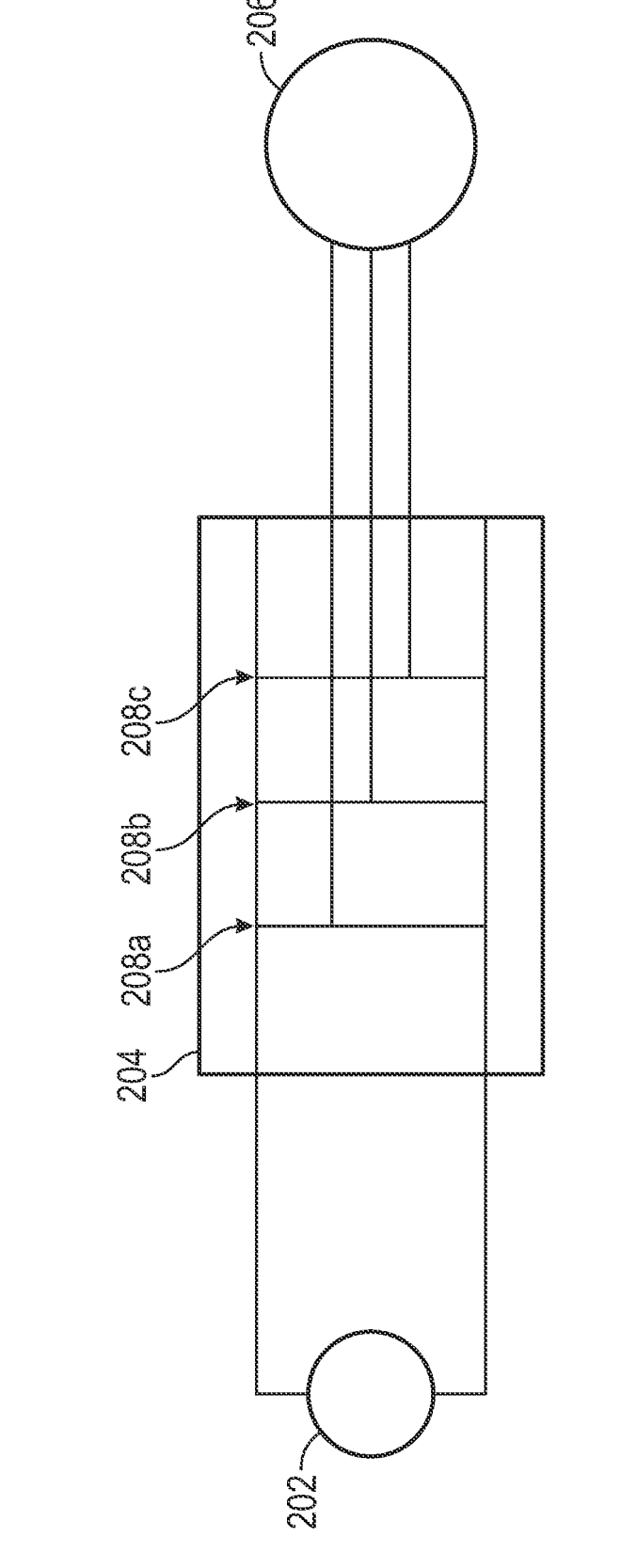
FIG. 2 shows an electrical system of the vehicle in an embodiment.

FIG. 2 shows an electrical system 200 of the vehicle 10 in an embodiment. The electrical system 200 includes a battery 202 or DC power source, an inverter 204 for converting the DC power to and from AC power, and a motor 206 that operates using the AC power. The motor 206 is generally a 3-phase motor. The inverter 204 includes at least three branches 208a, 208b, 208c of switches. Each switch includes switches which control conversion of the DC power to AC power along the branch. In an embodiment, the switches include a transistor having a diode that spans from the source to the drain of the transistor. The transistor can be controlled by a gate voltage to control the flow of current through the transistor. The transistor can be an insulated-gate bipolar transistor (IGBT) or a metal-oxide-semiconductor field-effect transistor (MOSFET) or any other suitable transistor.

Figure 3:
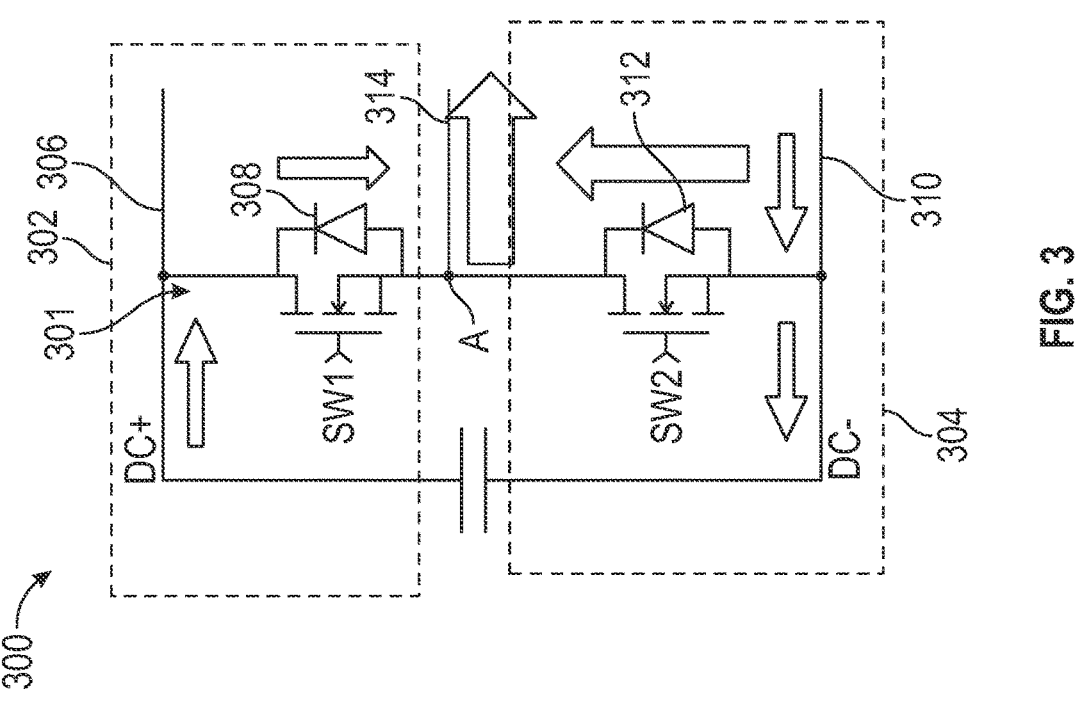
FIG. 3 shows a schematic diagram of a branch of the inverter of FIG. 2.

FIG. 3 shows a schematic diagram 300 of a branch 301 (such as branch 208a, for example) of the inverter 204 of FIG. 2. The branch 301 includes a high side 302 and a low side 304. The high side 302 includes a high voltage bus 306 coupled to a positive DC voltage and a first switch 308 (SW1) between the high voltage bus and a node A. The low side 304 includes a low voltage bus 310 coupled to a negative DC voltage and a second switch 312 (SW2) between the low voltage bus and the node A. An AC output bus 314 provides output current from node A.

Figure 4:
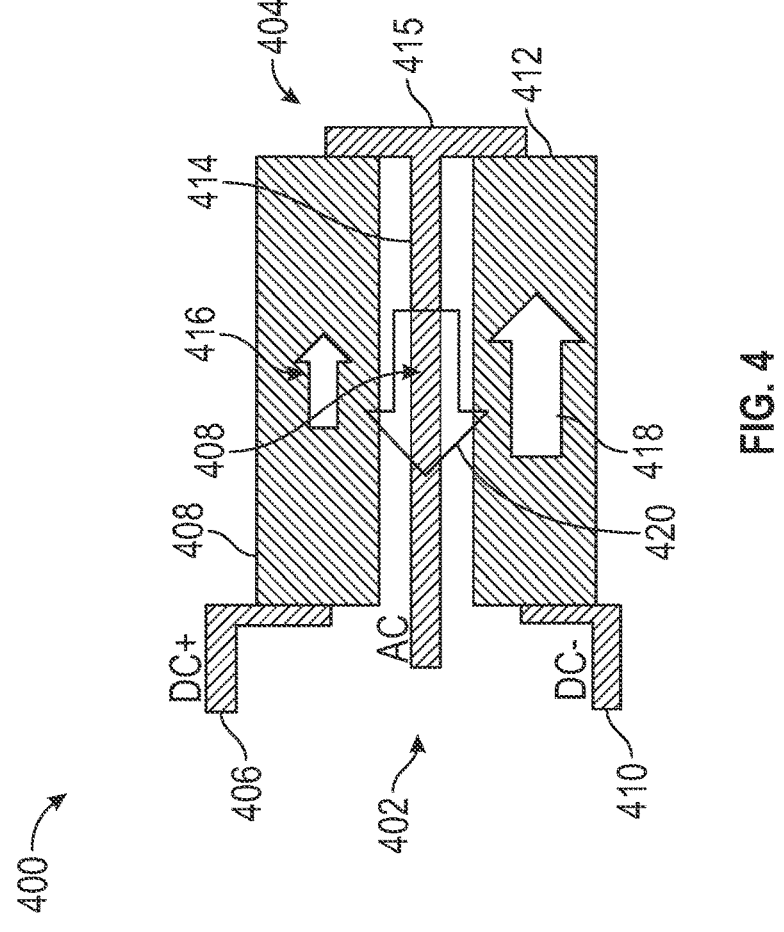
FIG. 4 shows a power module that corresponds to the branch of the schematic diagram of FIG. 3.

FIG. 4 shows a power module 400 that corresponds to the branch 301 of the schematic diagram 300 of FIG. 3. The power module 400 extends from a first end 402 to a second end 404. The power module 400 includes a high side bus 406 corresponding to the high voltage bus 306 and which includes a first switch device 408 corresponding to the first switch 308 (SW1). The power module 400 includes a low side bus 410 corresponding to the low voltage bus 310 and which includes a second switch device 412 corresponding to the second switch 312 (SW2). The first switch device 408 and the second switch device 412 are each in the form of a plane or a flat die. An AC output bus 414 corresponds to the AC output bus 314 and is located between the first switch device 408 and the second switch device 412. The AC output bus 414 is in the form of a flat plate.

The first switch device 408, the second switch device 412 and the AC output bus 414 are aligned between the first end 402 and the second end 404. The first switch device 408 and the second switch device 412 connect to their respective voltage sources at the first end 402. At the second end 404, the first switch device 408, the second switch device 412 and the AC output bus 414 connect to each other at connector 415. High side current 416 flows through the first switch device 408 in a first direction (e.g., from the first end 402 to the second end 404), thereby producing a high-side magnetic field BHS (first magnetic field). Low side current 418 flows through the second switch device 412 in the first direction, thereby producing a low-side magnetic field BLs (second magnetic field). The AC output current 420 flows through the AC output bus 414 in a second direction opposite the first direction and thereby creates an AC output magnetic field BAC (third magnetic field). As a result of the arrangement of the power module 400, the high-side magnetic field BHS and the low-side magnetic field Bus cancel the AC output magnetic field BAC at the location of the AC output bus 414. This cancellation minimizes or reduces the occurrence of parasitic inductance in a commutation loop that includes the high side current (e.g., current through high side bus 406 and first switch device 408), the low side current (e.g., current through low side bus 210 and second switch device 412) and the AC output current (e.g., current through connector 415 and AC output bus 414), thereby reduces ringing effects and electromagnetic interference.

Figure 5A:
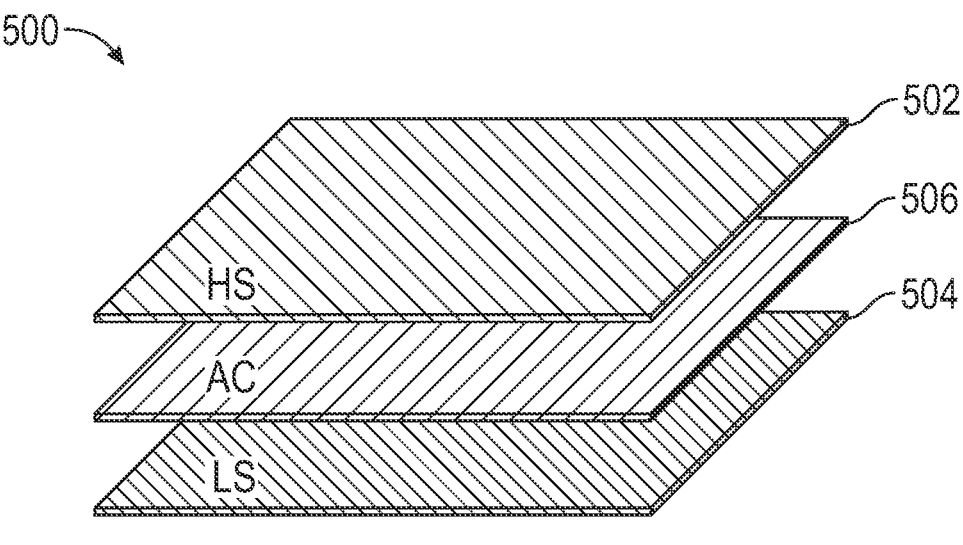
FIGS. 5A-5C show possible stacking arrangements for the power module in various embodiments.
Figure 5B:
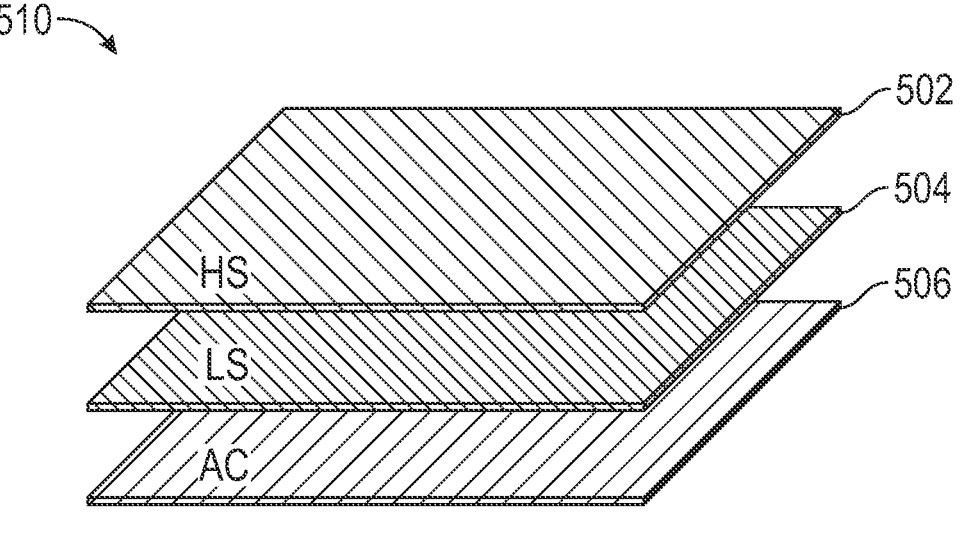
Figure 5C:
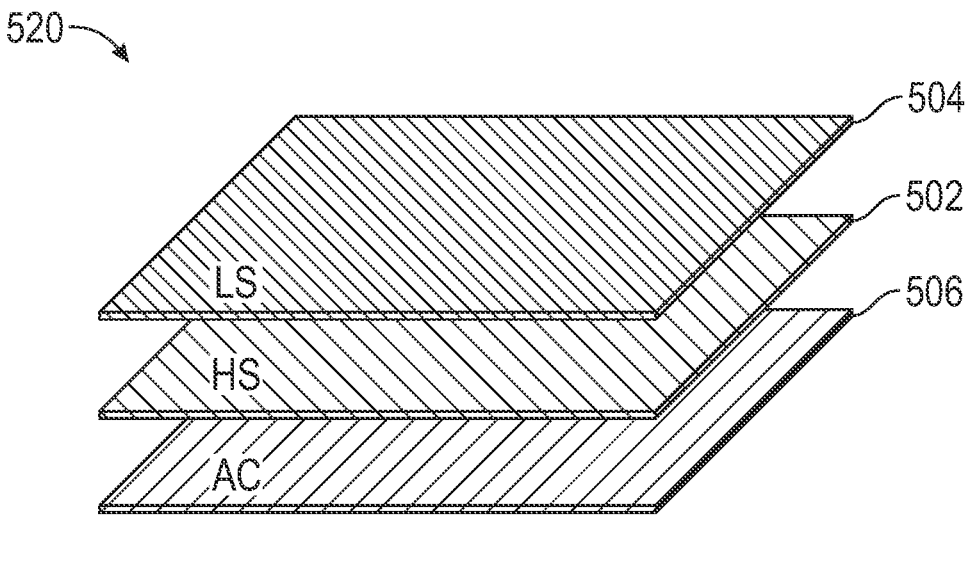

FIGS. 5A-5C show possible stacking arrangements for the power module 400 in various embodiments. FIG. 5A shows a first stacking arrangement 500. The high-side (HS) 302 (which includes the high voltage bus 306 and the first switch 308) lie within a first plane 502. The low-side (LS) 304 (which includes the low voltage bus 310 and the second switch 312) lie within a second plane 504 that is separate from and parallel to the first plane 502. The AC output bus 314 lies within a third plane 506. The third plane 506 is parallel to, and is disposed between, the first plane 502 the second plane 504.

FIG. 5B shows a second stacking arrangement 510. The first plane 502 (high-side), second plane 504 (low-side) and third plane 506 (AC output bus) are parallel to each other. The second plane 504 is disposed between the first plane 502 and the third plane 506.

FIG. 5C shows a third stacking arrangement 520. The first plane 502 (high-side), second plane 504 (low-side) and third plane 506 (AC output bus) are parallel to each other. The first plane 502 is disposed between the second plane 504 and the third plane 506.

Figure 6:
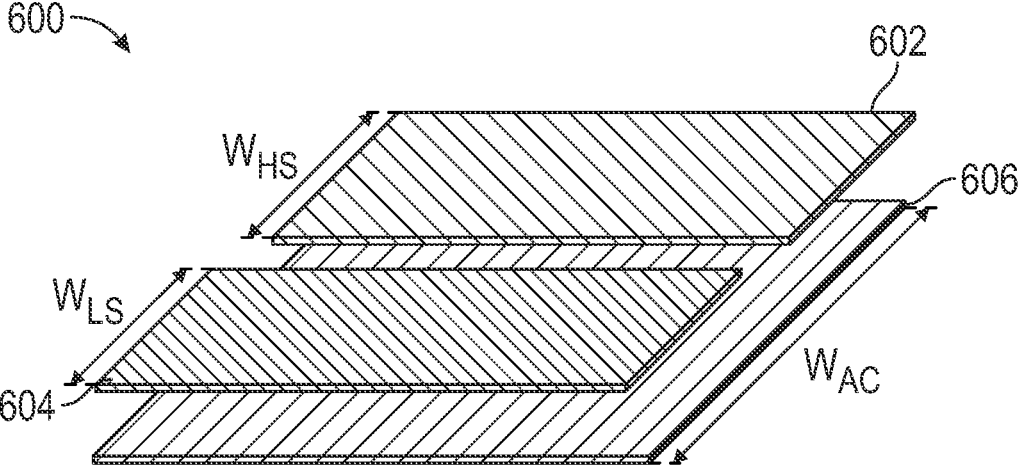
FIG. 6 shows another stack arrangement for the power module.

FIG. 6 shows another stack arrangement 600 for the power module 400. The high side 302 (including the high voltage bus 306 and the first switch 308) lie within a first planar die 602. The low side 304 (including the low voltage bus 310 and the second switch 312) lie within a second planar die 604 that is coplanar within the first planar die 602. The AC output bus 314 is disposed within a third planar die 606 located to one side (i.e., above or below) of the first planar die 602 and second planar die 604. The width $W_{AC}$ of the third planar die 606 can be selected to be approximately equal to the sum of the width $W_{HS}$ of the first planar die 602 and the width WLs of the second planar die 604.

Figures 7, 8:
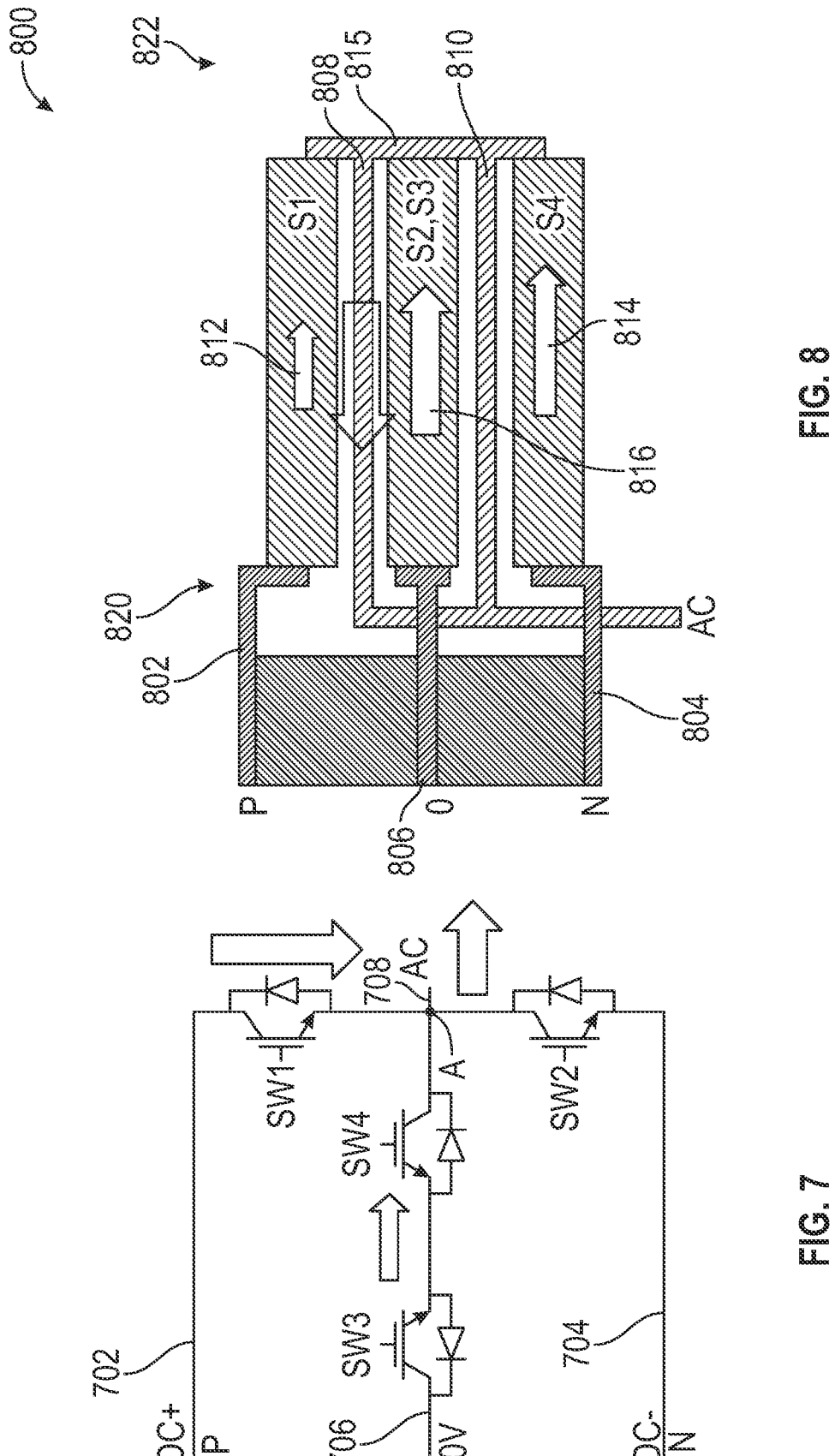
FIG. 7 shows a schematic diagram of a branch of a T-type inverter.
FIG. 8 shows a bus stack that corresponds to the T-type branch shown in the schematic diagram.

FIG. 7 shows a schematic diagram 700 of a T-type branch of an inverter. The T-type branch includes a positive voltage bus 702 that includes a first switch SW1, a negative voltage bus 704 that includes a second switch SW2, and a neutral bus 706 that includes a third switch SW3 and a fourth switch SW4. The neutral bus 706 is connected to neutral voltage. The positive voltage bus 702, negative voltage bus 704, the neutral bus 706 and an AC output path 708 connect to each other at a node A.

FIG. 8 shows a bus stack 800 that corresponds to the T-type branch shown in the schematic diagram 700. The bus stack 800 includes a high side bus 802, a low side bus 804, and a neutral bus 806. The high side bus 802 corresponds to the positive voltage bus 702. The low side bus 804 corresponds to the negative voltage bus 704. The neutral bus 806 corresponds to the neutral bus 706. A first AC output bus 808 and a second AC output bus 810 correspond to the AC output path 708.

The bus stack 800 extends from a first end 820 to a second end 822. At the first end 820, high side bus 802 connects to DC+ voltage, the low side bus 804 connects to DC-voltage, and the neutral bus 806 connects to a neutral voltage. At the second end 822, connector 815 connects the second ends of the high side bus 802, the low side bus 804, the neutral bus 806, the first AC output bus 808 and the second AC output bus 810.

The high side bus 802, the low side bus 804 and the neutral bus 806 each form planar dies which are arranged parallel to each other. The first AC output bus 808 is disposed between the high side bus 802 and the neutral bus 806. The second AC output bus 810 is disposed between the neutral bus 806 and the low side bus 804. High side current 812 (flowing through the high side bus 802), low side current 814 (flowing through the low side bus 804) and neutral current 816 (flowing through the neutral bus 806) flow from the first end 820 to the second end 822. The AC output current flows through one or more of the first AC output bus 808 and the second AC output bus 810 in a second direction (e.g., from the second end 822 to the first end 820) that is opposite the first direction.

The high side magnetic field produced by the high side current 812 flowing through the high side bus 802, the low side magnetic field produced by the low side current 814 flowing through the low side bus 804, and the neutral bus magnetic field produced by the neutral current 816 flowing through the neutral bus 806 cancel each other at the first AC output bus 808. Also, the high side magnetic field produced by the high side current 812 flowing through the high side bus 802, the low side magnetic field produced by the low side current 814 flowing through the low side bus 804 and the neutral bus magnetic field produced by the neutral current 816 flowing through the neutral bus 806 cancel each other at the second AC output bus 810.

Figure 9:
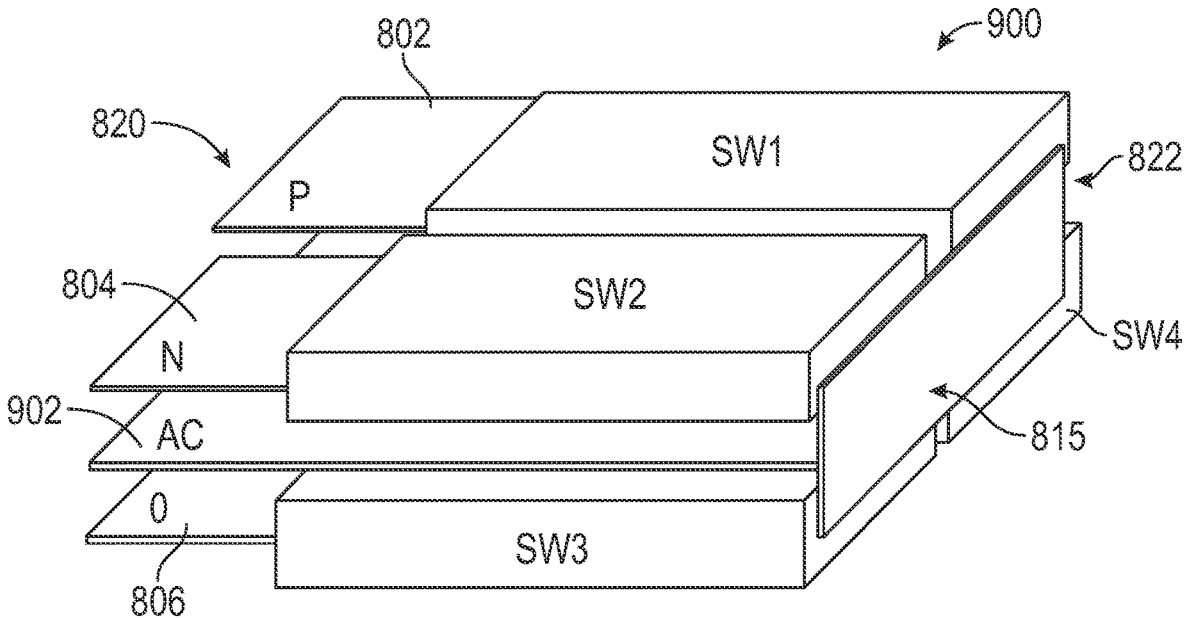
FIG. 9 shows a bus stack for the T-type branch of the inverter, in another embodiment.

FIG. 9 shows a bus stack 900 for the T-type branch of the inverter, in another embodiment. The high side bus 802 (and switch SW1) and the low side bus 804 (and switch SW2) reside next to each other in the same plane. The neutral bus 806 (and third switch SW3 and fourth SW4) is located to one side of the high side bus 802 and the low side bus 804. An AC output bus 902 is disposed between the neutral bus 806 (on one side) and the high side bus 802 and low side bus 804 (on an opposite side). These buses are connected to each other at the connector 815 located at a second end 822 of the bus stack 900.

Figure 10A:
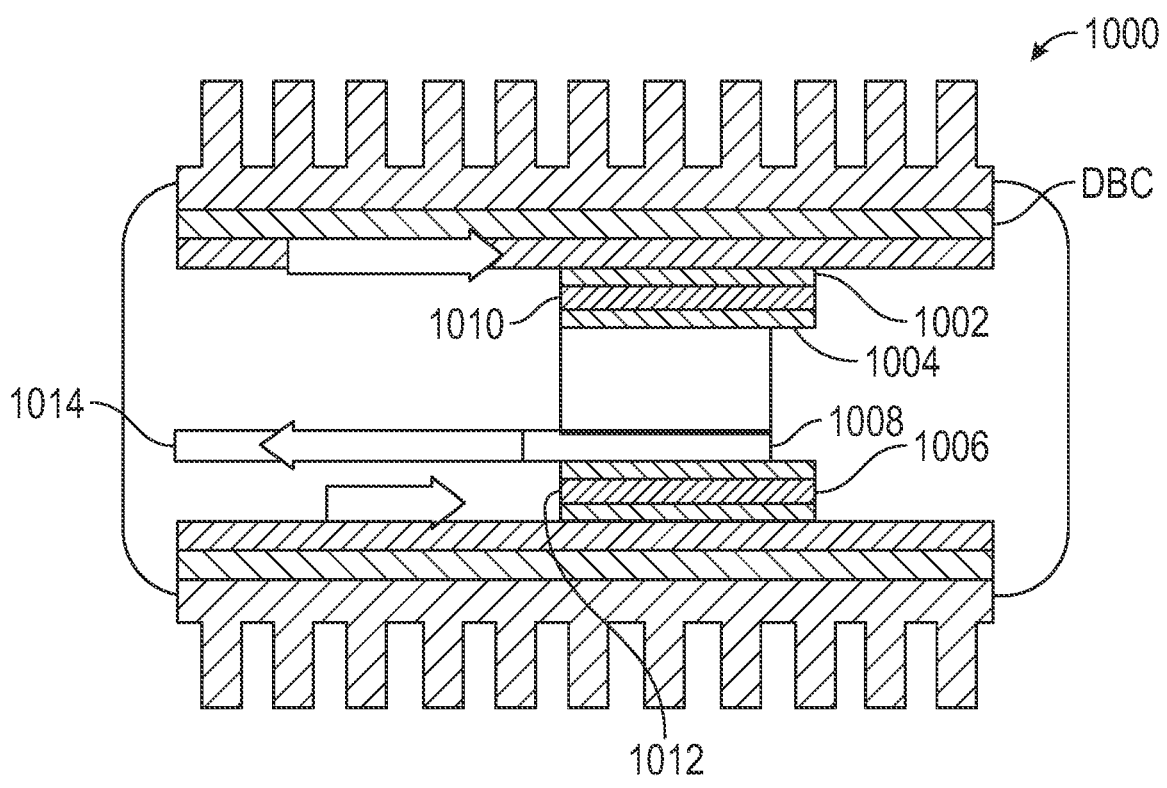
FIG. 10A shows a power module having a T-type inverter in an alternate embodiment.

FIG. 10A shows a power module 1000 having a T-type inverter in an alternate embodiment. The power module 1000 includes a P die 1002 that includes the positive bus and first switch SW1 and an N die 1004 that includes the negative bus and the second switch SW2, an O die 1006 that includes the third switch SW3 and fourth swtich SW4 and connects to the neutral point O, and the AC bus 1008. The P die 1002 and the N die 1004 are coplanar within a first plane 1010 that is perpendicular to the plane of FIG. 10A. The O die 1006 lies within a second plane 1012 parallel to the first plane 1010. The AC bus 1008 lies within a third plane 1014 disposed between and parallel to the first plane 1010 and the second plane 1012.

Figure 10B:
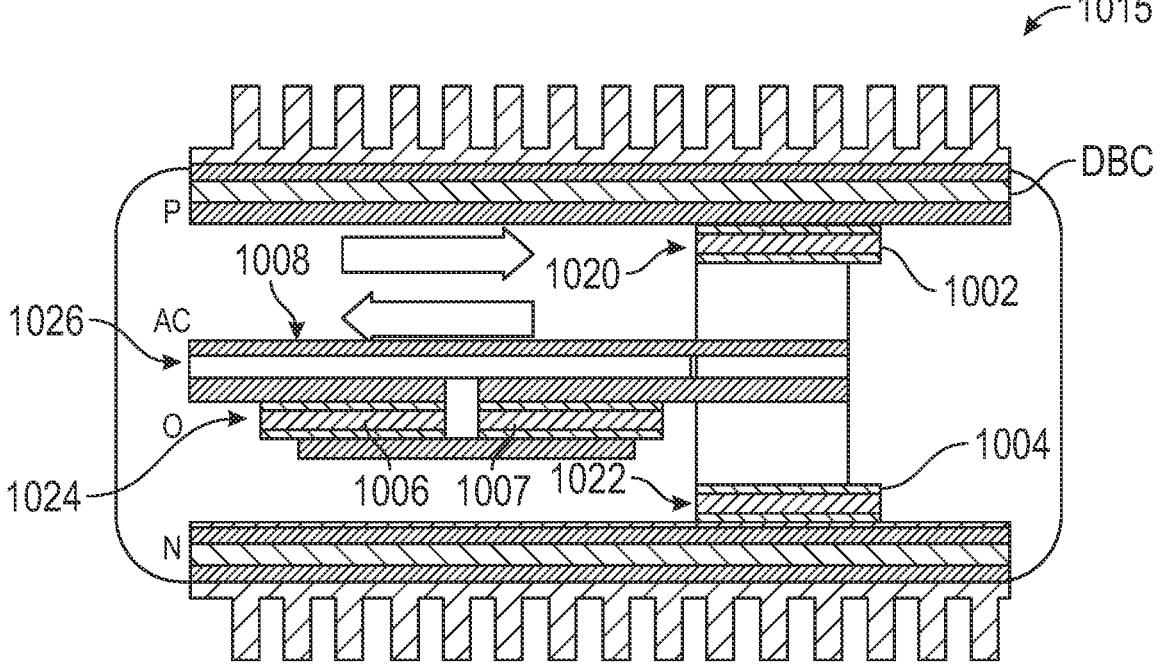
FIG. 10B shows a power module having a T-type inverter in an alternate embodiment.

FIG. 10B shows a power module 1015 having a T-type inverter in an alternate embodiment. The power module 1015 includes the P die 1002 in a first plane 1020 perpendicular to the plane of the page and the N die 1004 in a second plane 1022 parallel to the first plane. Two O die 1006 and 1007 lie within a third plane 1024. The AC bus 1008 lies within a fourth plane 1026. The third plane 1024 and the fourth plane 1026 are disposed between the first plane 1020 and the second plane 1022 and are parallel to the first plane and the second plane.

Figure 11:
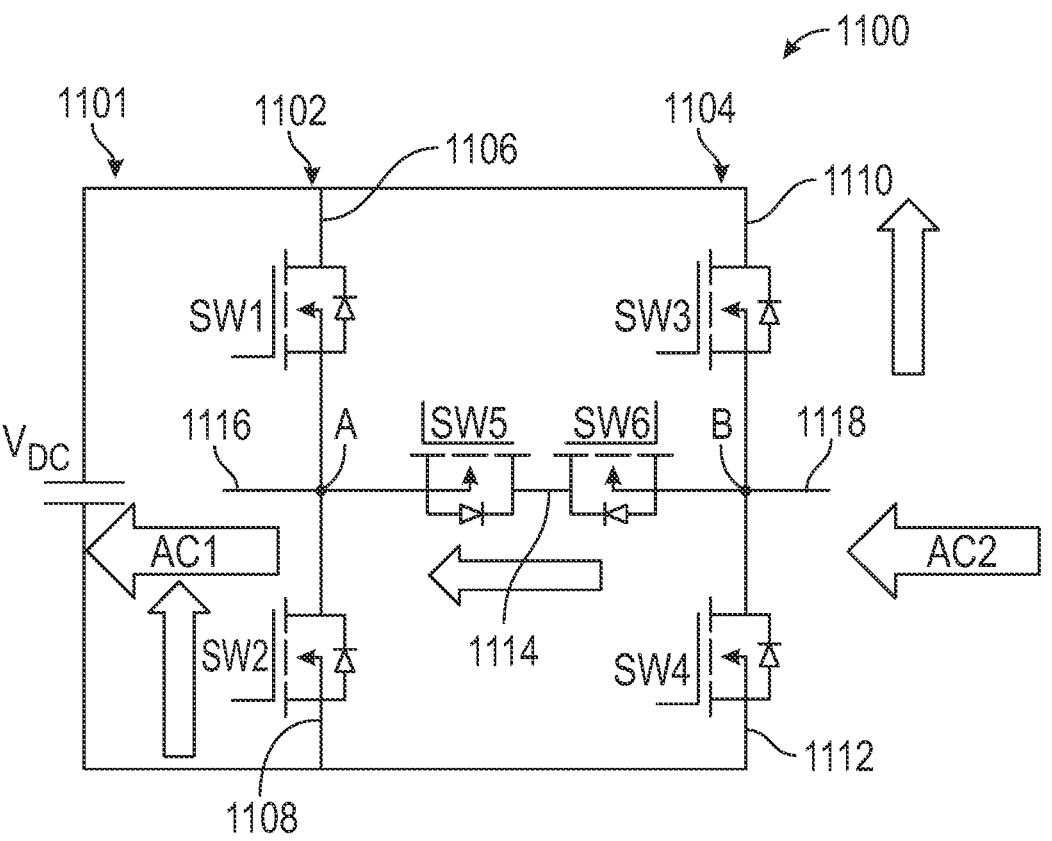
FIG. 11 shows a schematic diagram of an H-type branch of the inverter, in an embodiment.

FIG. 11 shows a schematic diagram 1100 of an H-type branch 1101 of the inverter, in an embodiment. The H-type branch 1101 includes a first leg 1102 across the power source and a second leg 1104 across the power source. The first leg 1102 includes first high side path 1106 and a first low side path 1108 connected is series. The first high side path 1106 includes a first switch SW1 and the first low side path 1108 includes a second switch SW2. The second leg 1104 includes second high side path 1110 and a second low side path 1112 connected in series. The second high side path 1110 includes a third switch SW3 and the second low side path 1112 includes a fourth switch SW4. A bridge path 1114 connects to the first leg 1102 between the first switch SW1 and the second switch SW2 and connects to the second leg 1104 between the third switch SW3 and the fourth switch SW4. The bridge path 1114 includes a fifth switch SW5 and a sixth switch SW6. A first AC output 1116 connects to a first node A between the first switch SW1 and the second switch SW2. A second AC output 1118 connects to a second node B between the third switch SW3 and the fourth switch SW4.

Figure 12:
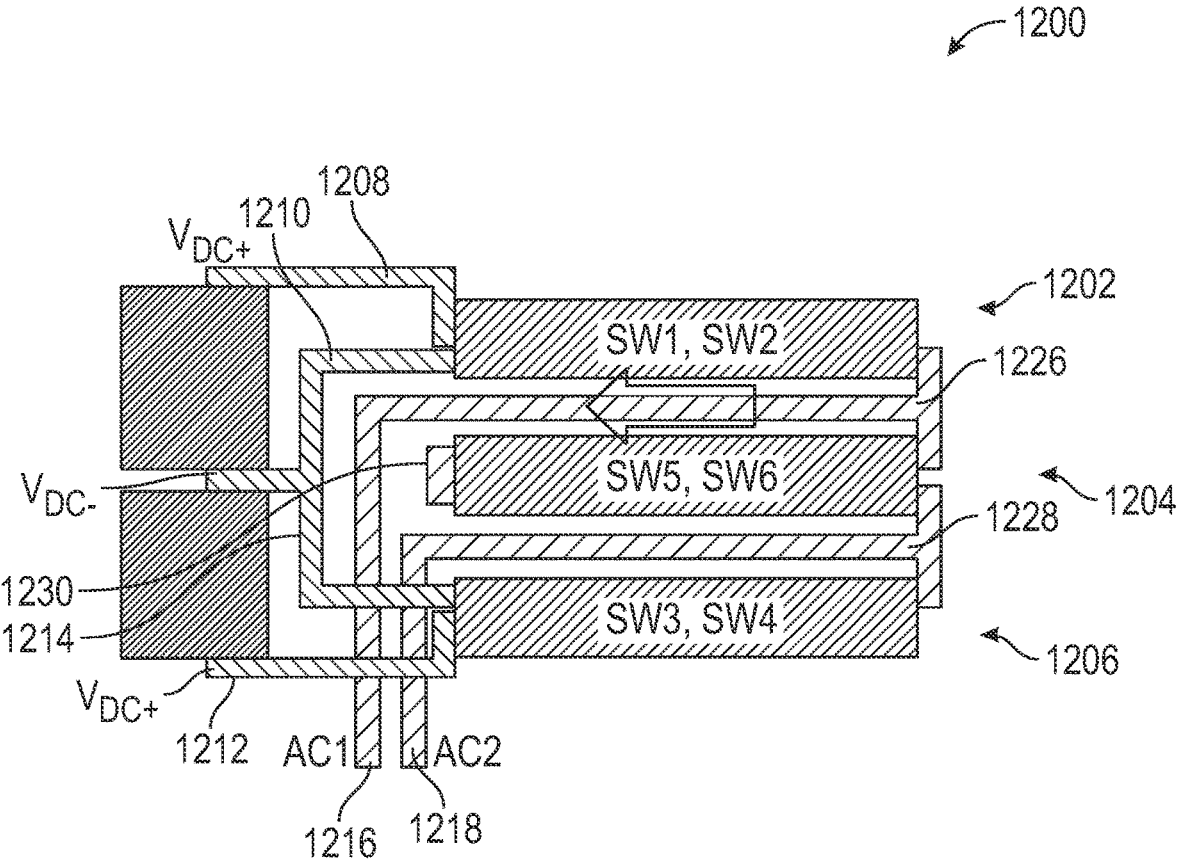
FIG. 12 shows a bus stack for the H-type branch of FIG. 11, in an embodiment.

FIG. 12 shows a bus stack 1200 for the H-type branch 1101 of FIG. 11, in an embodiment. The switches are arranged in three layers, referred to herein as a top layer 1202, a middle layer 1204 and a bottom layer 1206, for ease of explanation. The first switch SW1 and second switch SW2 are disposed next to each other in the top layer 1202. The third switch SW3 and fourth switch SW4 are disposed next to each other in the bottom layer 1206. The fifth switch SW5 and the sixth switch SW6 are disposed next to each other in the middle layer 1204. As view from the side, switches SW2, SW5 and SW3 are in the forefront and switches SW1, SW6 and SW4 are in the back.

First high side bus 1208 connects to switch SW1. First low bus 1210 connects to switch SW2. Second high bus 1212 connects to switch SW3. Second low bus 1214 connects to switch SW4. A first AC output bus 1216 passes between the top layer 1202 and the middle layer 1204 and connects to the switches SW1, SW2 and SW5 at a first connector 1226. A second AC output bus 1218 passes between the middle layer 1204 and bottom layer 1206 and connects the switches SW3, SW4 and SW6 at second connector 1228. A bridge bar 1230 connects switches SW5 and SW6.

Figure 13:
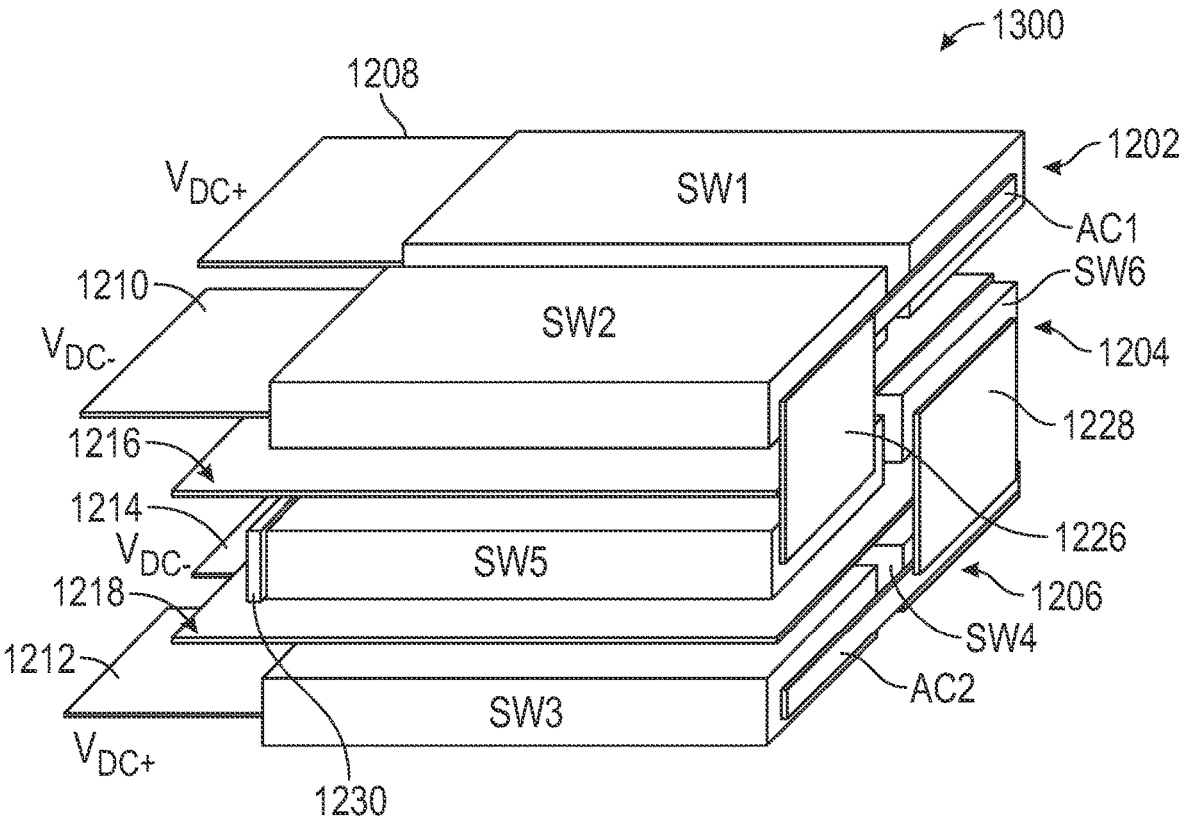
FIG. 13 shows a perspective view of the bus stack in a first embodiment.

FIG. 13 shows a perspective view 1300 of the bus stack 1200 in a first embodiment. The perspective view shows the connections between the switches. The first AC output bus 1216 extends from the first connector 1226 and passes between the top layer 1202 and the middle layer 1204. Thus, the magnetic fields due to currents flowing in the top layer 1202, the middle layer 1204 (switches SW1, SW2 and SW5) and the first AC output bus 1216 cancel each other at the first AC output bus 1216. The second AC output bus 1218 extends from the second connector 1228 and passes between the middle layer 1204 and the bottom layer 1206. Thus, the magnetic fields due to currents flowing in the middle layer 1204, the bottom layer 1206 (switches SW3, SW4 and SW6), and the second AC output bus 1218 cancel each other at the second AC output bus 1218.

Figure 14:
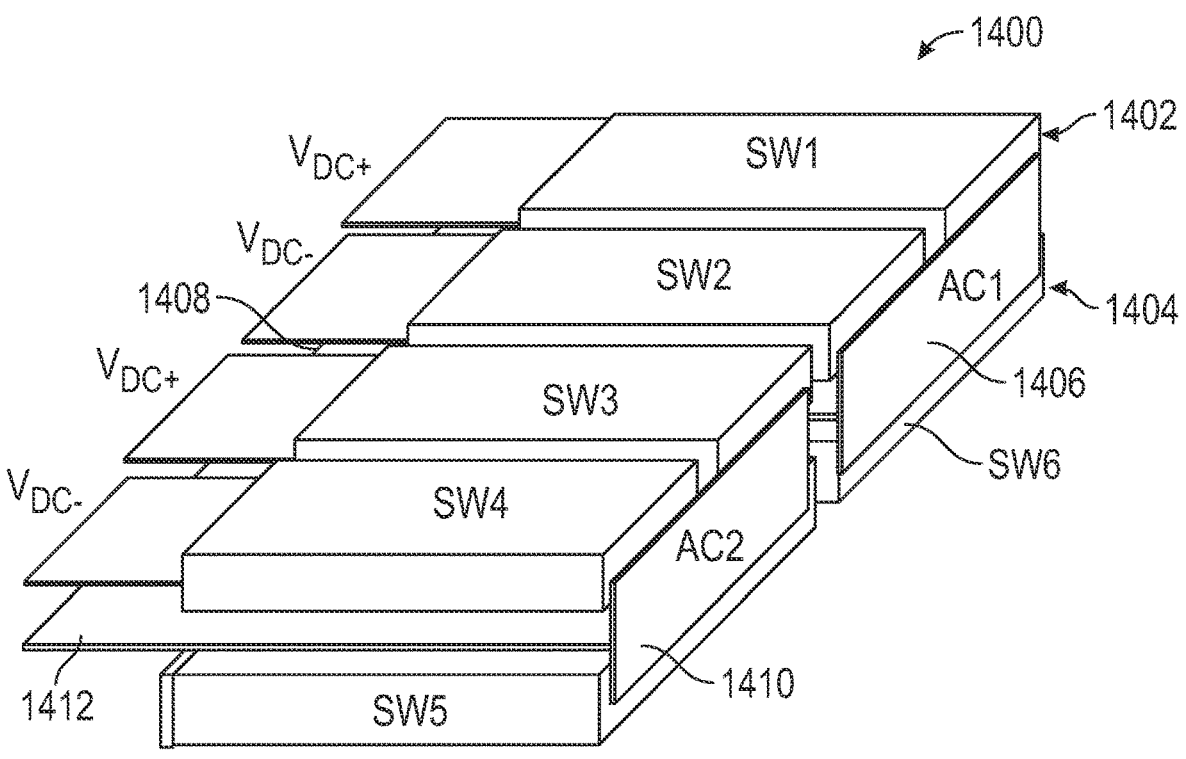
FIG. 14 shows a perspective view of the bus stack in a second embodiment.

FIG. 14 shows a perspective view 1400 of the bus stack 1200 in a second embodiment. The switches are arranged in two layers, referred to herein as a top layer 1402 and a bottom layer 1404, for ease of explanation. The first switch SW1, second switch SW2, third switch SW3 and fourth switch SW4 are disposed next to each other in the top layer 1202. Switch SW5 is disposed in the bottom layer 1404 beneath the first switch SW1 and second switch SW2. Switch SW6 is disposed in the bottom layer 1404 next to the fifth switch SW5 and beneath the third switch SW3 and fourth switch SW4.

A first connector 1406 (corresponding to node A) connects switches SW1, SW2 and SW5 at the second end. A first AC output bus 1408 extends from the first connector 1406 and passes between the top layer 1402 and the bottom layer 1404. The magnetic fields due to currents flowing in the top layer 1402, the bottom layer 1404 (switches SW1, SW2 and SW5), and the first AC output bus 1408 cancel each other at the first AC output bus 1408 to minimize or reduce the total parasitic inductance.

A second connector 1410 (corresponding to node B) connects the switches SW3, SW4 and SW6 at the second end. A second AC output bus 1412 extends from the second connector 1410 and passes between the top layer 1402 and the bottom layer 1404. The magnetic fields due to currents flowing in the top layer 1402, the bottom layer 1404 (switches SW3, SW4 and SW6), and the second AC output bus 1412 cancel each other at the second AC output bus 1412 to minimize or reduce the total parasitic inductance.

Figure 15:
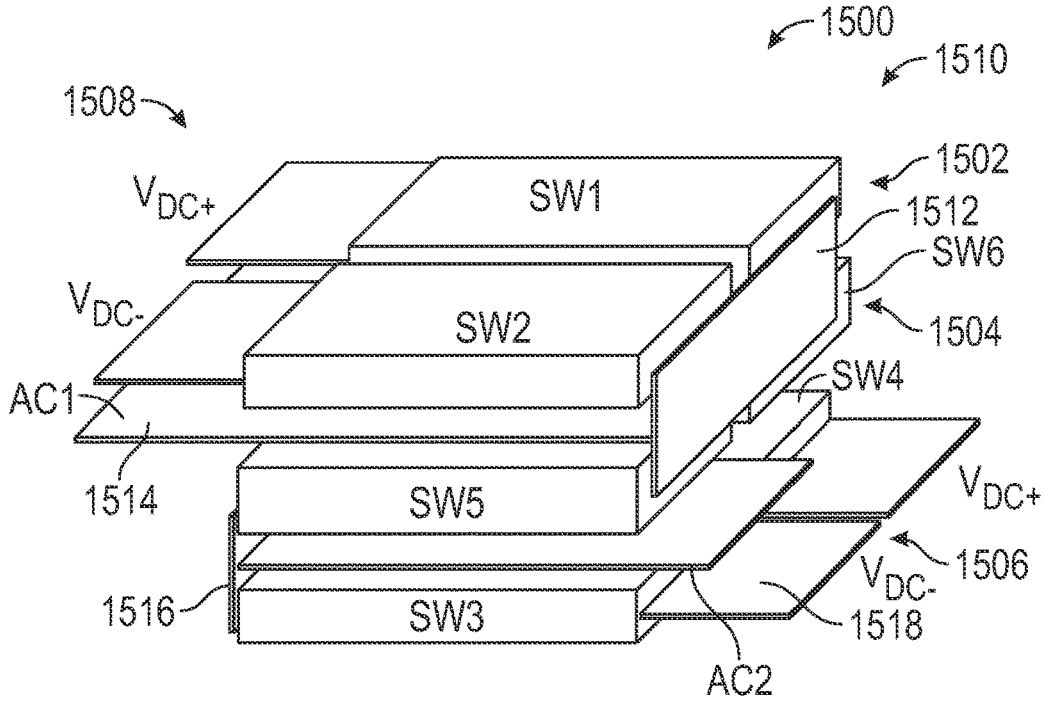
FIG. 15 shows a perspective view of the bus stack in a third embodiment.

FIG. 15 shows a perspective view 1500 of the bus stack 1200 in a third embodiment. The switches are arranged in three layers: a top layer 1502 (including switches SW1 and SW2), a middle layer 1504 (including a bidirectional switch SW5) and a bottom layer 1506 (including switches SW3 and SW4). The layers extend from a first end 1508 to a second end 1510. A first connector 1512 (corresponding to node A) connects the switches SW1, SW2, and SW5 at the second end 1510. A first AC output bus 1514 extends from the first connector 1512 and passes between the top layer 1502 and the middle layer 1504 towards the first end 1508. The magnetic fields due to currents flowing in the top layer 1202, the middle layer 1204 (switches SW1, SW2 and SW5), and the first AC output bus 1514 cancel each other at the first AC output bus 1514 to minimize or reduce the total parasitic inductance.

A second connector 1516 connects the switches SW3, SW4 and SW5 at the first end 1508. A second AC output bus 1518 extends from the second connector 1516 and passes between the middle layer 1204 and the bottom layer 1206 towards the second end 1510. The magnetic fields due to currents flowing in the middle layer 1504, the bottom layer 1506 (switches SW3, SW4 and SW5), and the second AC output bus 1518 cancel each other at the second AC output bus 1518 to minimize or reduce the total parasitic inductance.

Figure 16:
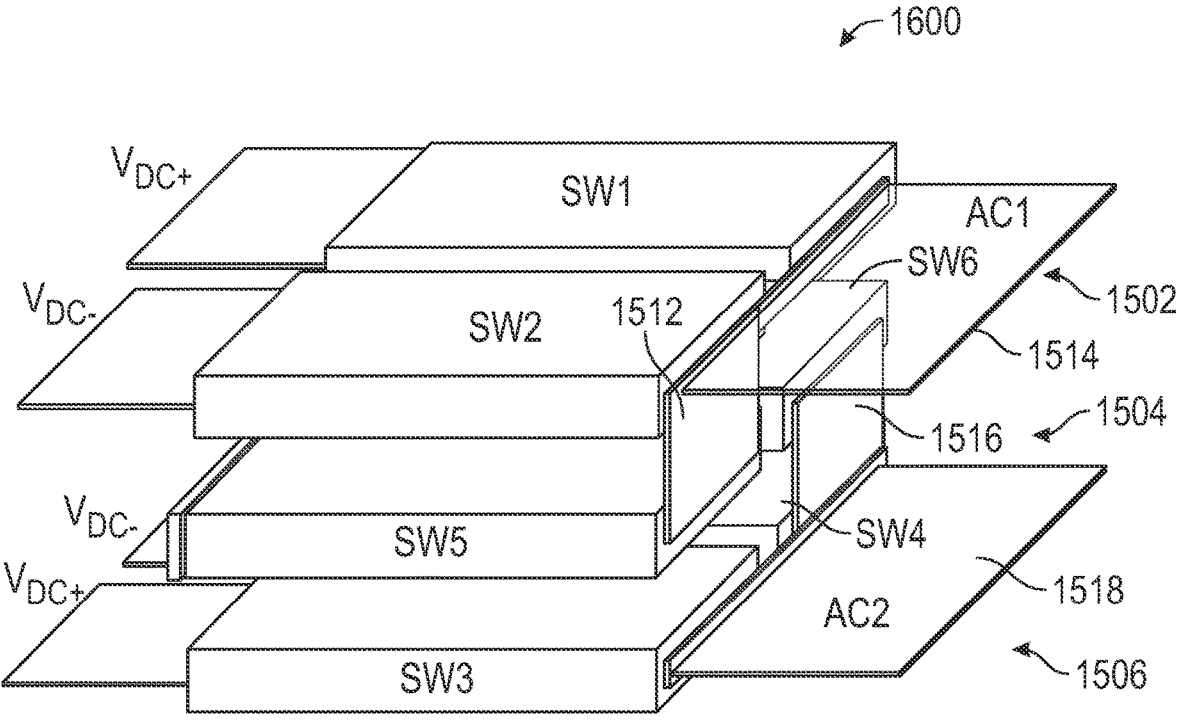
FIG. 16 shows a perspective view of the bus stack in a fourth embodiment.

FIG. 16 shows a perspective view 1600 of the bus stack 1200 in a fourth embodiment. The first connector 1512 connects the switches SW1, SW2 and SW5 at the second end and the first AC output bus 1514 extends from the first connector 1512 in a direction away from the switches. Similarly, the second connector 1516 connects the switches SW3, SW4 and SW6 at the second end and the second AC output bus 1518 extends from the second connector 1516 in a direction away from the switches.

Figure 17:
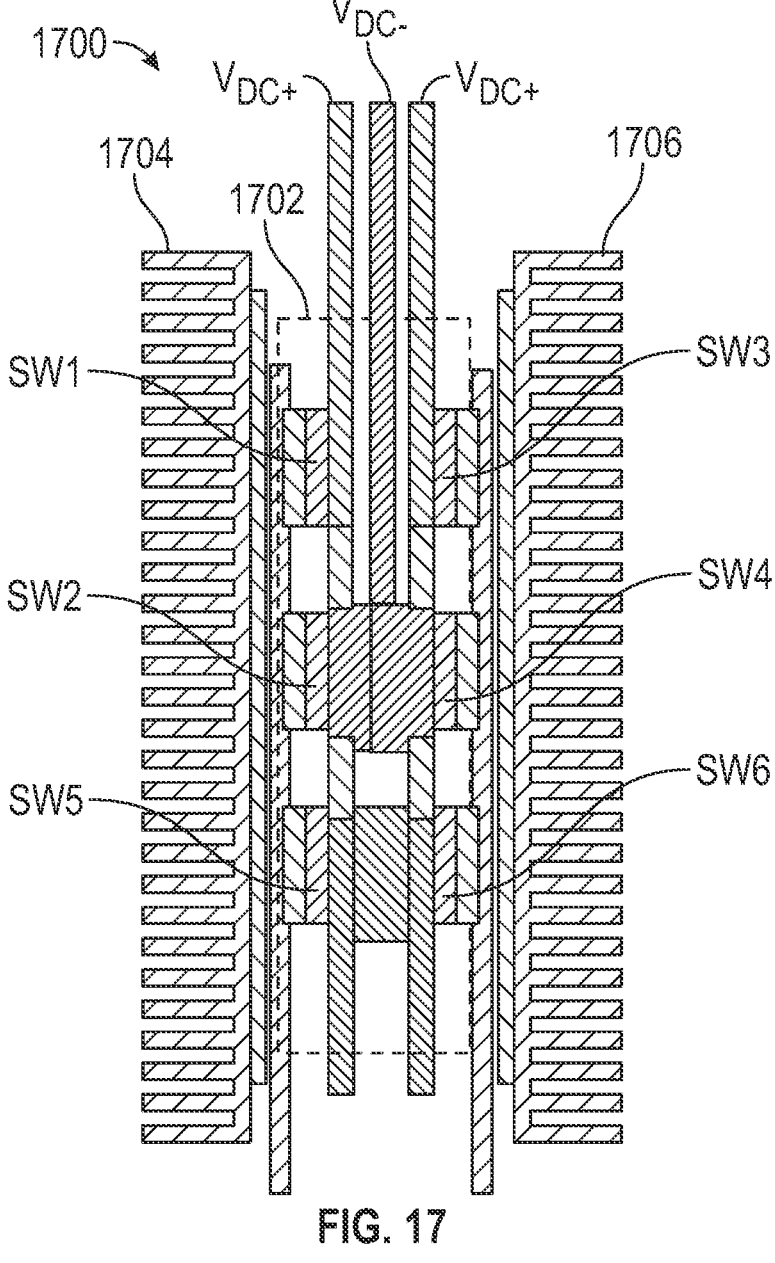
FIG. 17 shows side view of a power module having a two-sided cooling system for an H-type inverter.

FIG. 17 shows side view 1700 of a power module having a two-sided cooling system for an H-type inverter 1710, including switches SW1-SW6. The side view 1700 shows a switches section 1702 including switches SW1, SW2, and SW5 on a first side and switches SW3, SW4 and SW6 on a second side opposite the switches SW1, SW2 and SW5, respectively. A first heat sink 1704 is coupled to the first side and a second heat sink 1706 is coupled to the second side.

Figure 18:
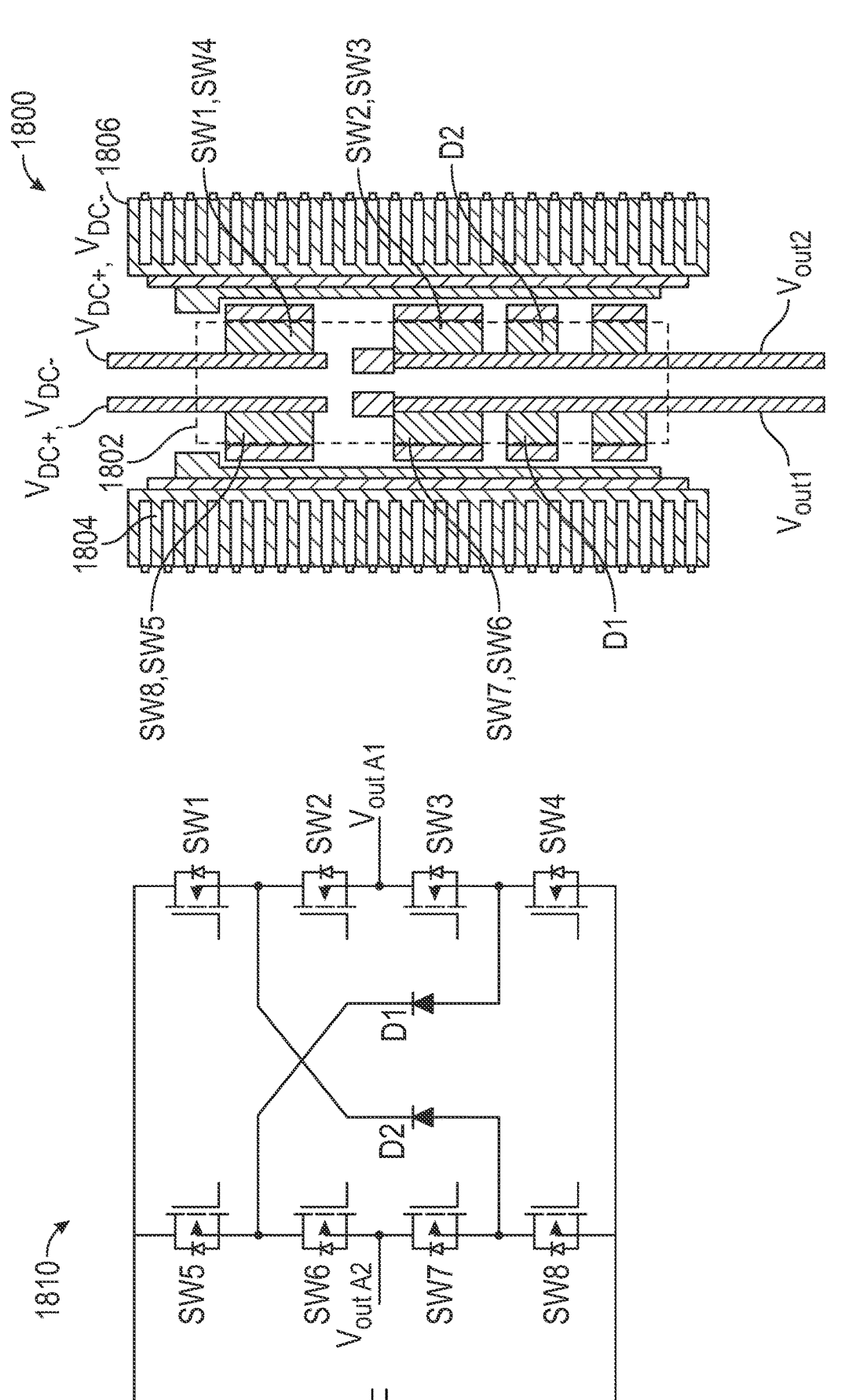
FIG. 18 shows side view of a power module having a two-sided cooling system for an X-type inverter.

FIG. 18 shows side view 1800 of a power module having a two-sided cooling system for an X-type inverter 1810, including switches SW1-SW8 and diodes D1 and D2. The side view 1800 shows a switches section 1802 including switches SW5, SW6, SW7 and SW8 on a first side and switches SW1, SW2, SW3 and SW4 on a second side. Switches SW1 and SW8 are opposite each other. Switches SW2 and SW7 are opposite each other. Switches SW3 and SW6 are opposite each other. Switches SW4 and SW5 are opposite each other. Diodes D1 is located on the first side and D2 is located on the second side. A first heat sink 1804 is coupled to the first side and a second heat sink 1806 is coupled to the second side.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A power module for an inverter, comprising:
a high side bus including a first switch, wherein a high side current is configured to flow through the first switch in a first direction;
a low side bus including a second switch, the low side bus parallel to the high side bus, wherein a low side current is configured to flow through the second switch in the first direction;
an alternating current (AC) output bus parallel to the high side bus and the low side bus, wherein an output current flows through the AC output bus in a second direction opposite to the first direction, wherein the high side bus and the low side bus are coplanar to each other within a first plane and the AC output bus is in a second plane;
a first heat sink coupled to the first plane; and
a second heat sink coupled to the second plane.

2. The power module of claim 1, wherein a first magnetic field generated by the high side current, a second magnetic field generated by the low side current, and a third magnetic field generated by the AC output current cancel each other to minimize or reduce an occurrence of a parasitic inductance in a commutation loop.

3. The power module of claim 1, wherein the first switch and the second switch are coplanar to each other in the first plane and a third switch and a fourth switch are coplanar to each other in the second plane parallel to the first plane, wherein the AC output bus is between the first plane and the second plane.

4. A power module for an inverter, comprising:
a high side bus including a first switch, wherein a high side current is configured to flow through the first switch in a first direction;

a low side bus including a second switch, the low side bus parallel to the high side bus, wherein a low side current is configured to flow through the second switch in the first direction;
an alternating current (AC) output bus parallel to the high side bus and the low side bus, wherein an output current flows through the AC output bus in a second direction opposite to the first direction, wherein the high side bus is in a first plane, the low side bus in in a second plane parallel to the first plane, the AC output bus is in a third plane and the third plane is between the first plane and the second plane.

5. The power module of claim 4, wherein a first magnetic field generated by the high side current, a second magnetic field generated by the low side current, and a third magnetic field generated by the AC output current cancel each other to minimize or reduce an occurrence of a parasitic inductance in a commutation loop.

6. A vehicle, comprising:
an inverter having a power module, the power module including:
a high side bus including a first switch, wherein a high side current is configured to flow through the first switch in a first direction;
a low side bus including a second switch, the low side bus parallel to the high side bus, wherein a low side current is configured to flow through the second switch in the first direction; and
an AC output bus parallel to the high side bus and the low side bus, wherein an output current flows through the AC output bus in a second direction opposite to the first direction,
wherein the power module comprises a first plane of switches, a second plane of switches and a third plane of switches, each parallel to each other, wherein the AC output bus includes a first AC output bus disposed between the first plane of switches and the second plane of switches and a second AC output bus disposed between the second plane of switches and the third plane of switches.

7. A power module for an inverter, comprising:
a high side bus including a first switch, wherein a high side current is configured to flow through the first switch in a first direction;
a low side bus including a second switch, the low side bus parallel to the high side bus, wherein a low side current is configured to flow through the second switch in the first direction;
an alternating current (AC) output bus parallel to the high side bus and the low side bus, wherein an output current flows through the AC output bus in a second direction opposite to the first direction,
wherein the comprises a first plane, a second plane and a third plane, each parallel to each other, wherein the AC output bus includes a first AC output bus disposed between the first plane and the second plane and a second AC output bus disposed between the second plane and the third plane.

8. The power module of claim 7, wherein the first AC output bus connects to switches in the first plane and in the second plane at an end of the power module and the second AC output bus connects to switches in the second plane and in the third plane at the end of the power module.

9. The power module of claim 7, wherein the second AC output bus connects to switches in the second plane and in the third plane at a first end of the power module and the first AC output bus connects to switches in the first plane and in the second plane at a second end of the power module.

10. The power module of claim 7, wherein the inverter is one of a T-type inverter, an H-type inverter, and an X-type inverter.

11. A vehicle, comprising:

an inverter having a power module, the power module including:

a high side bus including a first switch, wherein a high side current is configured to flow through the first switch in a first direction;

a low side bus including a second switch, the low side bus parallel to the high side bus, wherein a low side current is configured to flow through the second switch in the first direction;

an AC output bus parallel to the high side bus and the low side bus, wherein an output current flows through the AC output bus in a second direction opposite to the first direction, wherein the high side bus and the low side bus are coplanar to each other within a first plane and the AC output bus is in a second plane;

a first heat sink coupled to the first plane; and a second heat sink is coupled to the second plane.

12. A vehicle, comprising:

an inverter having a power module, the power module including:

a high side bus including a first switch, wherein a high side current is configured to flow through the first switch in a first direction;

a low side bus including a second switch, the low side bus parallel to the high side bus, wherein a low side current is configured to flow through the second switch in the first direction; and an AC output bus parallel to the high side bus and the low side bus, wherein an output current flows through the AC output bus in a second direction opposite to the first direction, wherein the high side bus is in a first plane, the low side bus in in a second plane parallel to the first plane, the AC output bus is in a third plane, and the third plane is between the first plane and the second plane.

13. The vehicle of claim 11, wherein a first magnetic field of the high side current, a second magnetic field of the low side current, and a third magnetic field generated by the AC output current cancel each other to minimize or reduce an occurrence of a parasitic inductance in a commutation loop.

14. The vehicle of claim 11, wherein the first switch and the second switch are coplanar to each other in a first plane of switches and a third switch and a fourth switch are coplanar to each other in a second plane of switches parallel to the first plane of switches, wherein the AC output bus is between the first plane of switches and the second plane of switches.

15. The vehicle of claim 6, wherein the first AC output bus connects to switches in the first plane of switches and the second plane of switches at an end of the power module and the second AC output bus connects to switches in the second plane of switches and the third plane of switches at the end of the power module.

16. The vehicle of claim 6, wherein the second AC output bus connects to switches in the second plane of switches and the third plane of switches at a first end of the power module and the first AC output bus connects to switches in the first plane of switches and the second plane of switches at a second end of the power module.

17. The vehicle of claim 6, wherein the inverter is one of a T-type inverter, an H-type inverter, and an X-type inverter.

18. The power module of claim 7, wherein a first magnetic field generated by the high side current, a second magnetic field generated by the low side current, and a third magnetic field generated by the AC output current cancel each other to minimize or reduce an occurrence of a parasitic inductance in a commutation loop.

19. The vehicle of claim 12, wherein a first magnetic field of the high side current, a second magnetic field of the low side current, and a third magnetic field generated by the AC output current cancel each other to minimize or reduce an occurrence of a parasitic inductance in a commutation loop.

20. The vehicle of claim 6, wherein a first magnetic field of the high side current, a second magnetic field of the low side current, and a third magnetic field generated by the AC output current cancel each other to minimize or reduce an occurrence of a parasitic inductance in a commutation loop.

* * * * *